(12) United States Patent
Yamanaka

(10) Patent No.: US 10,141,020 B2
(45) Date of Patent: Nov. 27, 2018

(54) DISPLAY DEVICE AND DRIVE METHOD FOR SAME

(71) Applicant: SHARP KABUSHIKI KAISHA, Sakai (JP)

(72) Inventor: Shigetsugu Yamanaka, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 15/327,584

(22) PCT Filed: Jul. 16, 2015

(86) PCT No.: PCT/JP2015/070357
§ 371 (c)(1),
(2) Date: Jan. 19, 2017

(87) PCT Pub. No.: WO2016/013475
PCT Pub. Date: Jan. 28, 2016

(65) Prior Publication Data
US 2017/0162226 A1    Jun. 8, 2017

(30) Foreign Application Priority Data
Jul. 23, 2014    (JP) .................. 2014-150198

(51) Int. Cl.
*G11B 20/18* (2006.01)
*G09G 5/00* (2006.01)
(Continued)

(52) U.S. Cl.
CPC ........... *G11B 20/18* (2013.01); *G09G 3/3233* (2013.01); *G09G 3/36* (2013.01); *G09G 5/00* (2013.01);
(Continued)

(58) Field of Classification Search
CPC . G11B 20/18; G09G 3/36; G09G 5/00; G09G 5/024; G09G 5/026; G09G 2320/0233
See application file for complete search history.

(56) References Cited

U.S. PATENT DOCUMENTS

2005/0285822 A1* 12/2005 Reddy ................. G06F 3/03542
345/76
2007/0210996 A1    9/2007 Mizukoshi et al.
(Continued)

FOREIGN PATENT DOCUMENTS

JP    2005-284172    10/2005
JP    2006-201630     8/2006
(Continued)

OTHER PUBLICATIONS

International Search Report dated Oct. 6, 2015, directed to International Application No. PCT/JP2015/070357, 6 pages.

*Primary Examiner* — Kyle Vallecillo
(74) *Attorney, Agent, or Firm* — ScienBiziP, P.C.

(57) ABSTRACT

An initial current ratio calculation unit obtains an initial current ratio for each pixel based on a current measurement result by a data line drive/current measurement circuit. A light emission current efficiency calculation unit obtains a light emission current efficiency for each pixel referring to an LUT, based on a measured operating temperature and the initial current ratio. A first correction unit corrects a video signal for each pixel in view of characteristics of each pixel, based on the current measurement result and the light emission current efficiency. A second correction unit obtains a correction term for each pixel in view of a difference in the light emission current efficiency compared to neighboring pixels, based on a two-dimensional distribution of the light emission current efficiency. The correction term obtained by
(Continued)

the second correction unit is added to the video signal corrected to obtain a corrected video signal.

10 Claims, 6 Drawing Sheets

(51) Int. Cl.
    *G09G 5/02*     (2006.01)
    *G09G 3/36*     (2006.01)
    *G09G 3/3233*     (2016.01)

(52) U.S. Cl.
    CPC ............ *G09G 5/024* (2013.01); *G09G 5/026* (2013.01); *G09G 2320/029* (2013.01); *G09G 2320/0233* (2013.01); *G09G 2320/0295* (2013.01); *G09G 2320/041* (2013.01); *G09G 2320/043* (2013.01)

(56) References Cited

U.S. PATENT DOCUMENTS

| | | | |
|---|---|---|---|
| 2008/0111812 A1* | 5/2008 | Shirasaki | G09G 3/3233 345/212 |
| 2008/0238953 A1* | 10/2008 | Ogura | G09G 3/3275 345/697 |
| 2009/0135166 A1* | 5/2009 | Uchino | G09G 3/006 345/205 |
| 2009/0295422 A1* | 12/2009 | Hamer | G09G 3/3233 324/760.02 |
| 2009/0295423 A1* | 12/2009 | Levey | G09G 3/006 324/760.01 |
| 2010/0007656 A1 | 1/2010 | Okamoto et al. | |
| 2010/0259533 A1* | 10/2010 | Yamashita | G09G 3/3233 345/213 |
| 2011/0122324 A1* | 5/2011 | Yamashita | G09G 3/3233 348/739 |
| 2011/0122325 A1* | 5/2011 | Yamashita | G09G 3/3233 348/739 |
| 2011/0157133 A1* | 6/2011 | Ogura | G09G 3/20 345/211 |
| 2011/0157134 A1* | 6/2011 | Ogura | G09G 3/20 345/211 |
| 2015/0221253 A1* | 8/2015 | Yamamoto | G09G 3/3233 345/78 |
| 2016/0086548 A1* | 3/2016 | Maeyama | G09G 3/3258 345/690 |
| 2016/0353070 A1* | 12/2016 | Okamoto | H05B 33/0869 |
| 2017/0124948 A1* | 5/2017 | Minami | G09G 3/3233 |

FOREIGN PATENT DOCUMENTS

| | | |
|---|---|---|
| JP | 2010-20078 | 1/2010 |
| JP | 2010-286783 | 12/2010 |

* cited by examiner

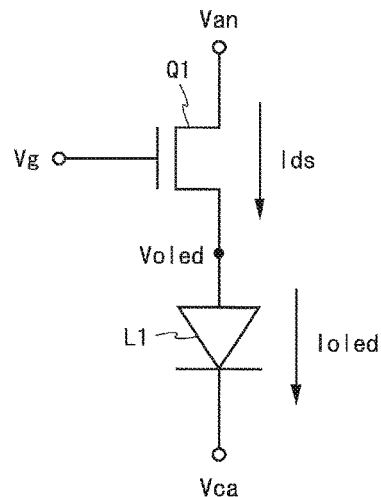
Fig. 1
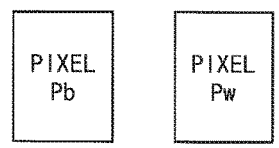
Fig. 2
Fig. 3
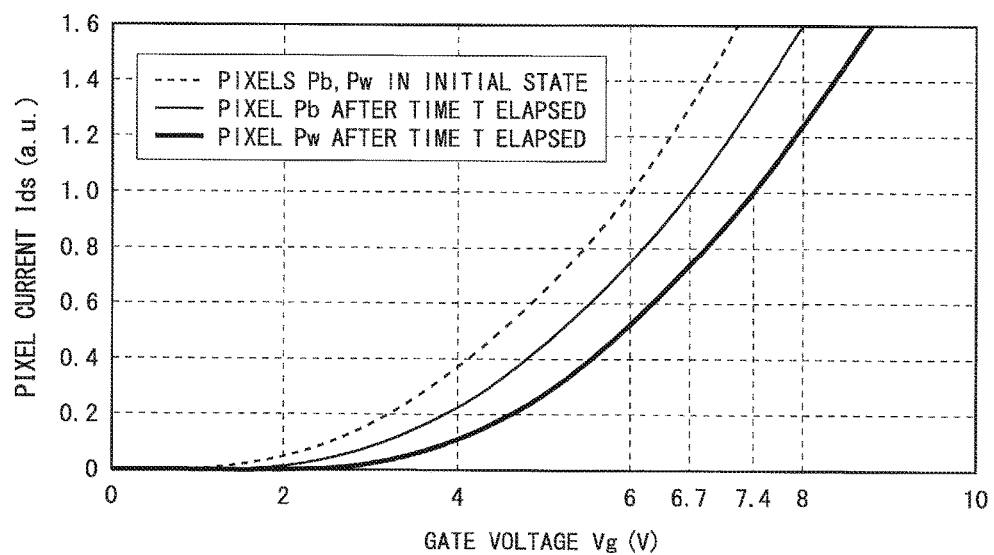

DISPLAY DEVICE AND DRIVE METHOD FOR SAME

CROSS-REFERENCE TO RELATED APPLICATIONS

This application is a U.S. National Phase patent application of International Patent Application No. PCT/JP2015/070357, filed Jul. 16, 2015, which claims priority to Japanese Application No. 2014-150198, filed on Jul. 23, 2014, each of which is hereby incorporated by reference in the present disclosure in its entirety.

FIELD OF THE INVENTION

The present invention relates to a display device, and more particularly to a current drive-type display device and a drive method for the display device.

BACKGROUND OF THE INVENTION

In recent years, an organic EL (electro luminescence) display device has been attracting attention as a thin, light-weight, and fast response display device. The organic EL display device includes a plurality of pixels arranged two-dimensionally. Typically, the pixel of the organic EL display device includes one organic EL element and one drive TFT (thin film transistor). The organic EL element emits light at luminance in accordance with an amount of a current passing therethrough. The drive TFT is provided in series with the organic EL element, and controls the amount of the current flowing through the organic EL element.

Variation is caused in characteristics of the elements in the pixel during manufacturing. Moreover, the characteristics of the elements in the pixel fluctuate as time proceeds. For example, characteristics of the drive TFT deteriorate individually in accordance with light emission luminance and light emission time. The same holds true for characteristics of the organic EL element. As a result, even when the same voltage is applied to gate terminals of the drive TFTs, variation is caused in the light emission luminance of the organic EL elements. Thus, in order to perform high image quality display in the organic EL display device, there is known a method in which a video signal is corrected so as to compensate for variation or fluctuation in the characteristics of the organic EL element and the drive TFT. For example, Patent Document 1 describes an organic EL display device in which a drive current is read out to an outside via a power supply line, a gain for correction and an offset for correction are updated based on an amount of the measured drive current, and the video signal is corrected using these data.

Moreover, when the same image is displayed in the organic EL display device for a long time, the characteristics of the elements in the pixels fluctuate in accordance with a pattern of a display image, and its influence may appear in a display screen. This phenomenon is called burning. For an organic EL display device configured to prevent the burning, the following techniques have been conventionally known. Patent Document 2 describes a display device in which deterioration characteristics of the light emission luminance of the pixel are obtained based on the video signal and the like, and the video signal is corrected so that the light emission luminance changes smoothly in the vicinity of a boundary of the deterioration characteristics. Patent Document 3 describes a light emission-type display device in which a target chromaticity is set so that deterioration characteristics of each color of organic EL are equal, and an input image signal is corrected so that a chromaticity of a burning prevention target portion becomes close to the target chromaticity. Patent Document 4 describes a burning phenomenon correction method in which a difference between a deterioration amount of a correction target pixel and a deterioration amount of a reference pixel is accumulated, and whether or not an input signal is to be corrected is switched in accordance with whether an accumulated amount is increased or decreased by an addition this time.

PRIOR ART DOCUMENT

[Patent Document 1] Japanese Laid-Open Patent Publication No. 2005-284172
[Patent Document 2] Japanese Laid-Open Patent Publication No. 2010-20078
[Patent Document 3] Japanese Laid-Open Patent Publication No. 2010-286783
[Patent Document 4] Japanese Laid-Open Patent Publication No. 2006-201630

SUMMARY OF THE INVENTION

As a method for performing high image quality display in the organic EL display device, there can be considered a method in which a current flowing through the drive TFT and/or the organic EL element is measured periodically, and the video signal is corrected based on a current measurement result so that an amount of the current flowing through the organic EL element becomes a predetermined amount (an amount in accordance with the video signal). It is possible to make a desired amount of current flow through the organic EL element by using this method, even if the variation or fluctuation is caused in the characteristics of the drive TFT and/or the organic EL element.

However, luminance of the organic EL element depends not only on the amount of the current passing therethrough but also on a light emission current efficiency. The light emission current efficiency of the organic EL element deteriorates individually in accordance with the light emission luminance and the light emission time. Thus, even if the desired amount of current is made to flow through the organic EL element by using the above-described method, the organic EL element does not necessarily emit light at a desired luminance (luminance in accordance with the video signal).

Moreover, when a screen including a checker pattern, a web content or the like is displayed for a long time, current stress received by the organic EL element differs largely on a basis of pixel region. In this case, a deterioration degree of the light emission current efficiency of the organic EL element differs largely on a basis of pixel region. Thus, even if the above-described method is used, a luminance difference is caused at a boundary between the pixel regions, and the image quality of the display image deteriorates.

Therefore, an object of the present invention is to provide a display device capable of reducing a luminance difference at a boundary between pixel regions.

According to a first aspect of the present invention, there is provided a current drive-type display device, including: a plurality of pixels arranged two-dimensionally, each including a display element and a drive element provided in series with the display element to control an amount of a current flowing through the display element; a current measurement circuit configured to measure a current which passes through the drive element and is output to an outside of the pixel, without passing through the display element; a correction calculation unit configured to correct a video signal based on a current measurement result by the current measurement circuit; and a drive circuit configured to write a voltage in accordance with a corrected video signal to the pixel, wherein the correction calculation unit includes: a light emission current efficiency calculation unit configured to obtain a light emission current efficiency of the display element for each pixel based on the current measurement result; a first correction unit configured to correct the video signal for each pixel in view of characteristics of each pixel, based on the current measurement result and the light emission current efficiency; and a second correction unit configured to obtain a correction term for each pixel in view of a difference in the light emission current efficiency compared to neighboring pixels, based on a two-dimensional distribution of the light emission current efficiency, and the correction calculation unit is configured to obtain the corrected video signal based on the video signal corrected by the first correction unit and the correction term obtained by the second correction unit.

According to a second aspect of the present invention, in the first aspect of the present invention, the second correction unit is configured to obtain for each pixel an average value of change rates of the light emission current efficiency between the pixel and the neighboring pixels, and obtain the correction term based on the average value for each pixel.

According to a third aspect of the present invention, in the second aspect of the present invention, the second correction unit is configured to obtain the correction term for each pixel by multiplying a value obtained by subtracting the average value from 1 by a coefficient for each pixel.

According to a fourth aspect of the present invention, in the third aspect of the present invention, when the light emission current efficiency of a pixel $P_{ij}$ in an i-th row and a j-th column is $\eta_{ij}$ and a coefficient for obtaining an amount of increase or decrease of a gradation voltage based on an amount of increase or decrease of the change rate of the light emission current efficient is $\delta$, the second correction unit is configured to take pixels within a range of $\pm p$ pixels in a horizontal direction and $\pm q$ pixels in a vertical direction as the neighboring pixels when the pixel $P_{ij}$ is in a center, and obtain the correction term shown by the following equation (a).

$$f2(\eta, i, j) = \delta \left\{ 1 - \frac{1}{(2p+1)(2q+1)} \sum_{x=-p}^{p} \sum_{y=-q}^{q} \frac{\eta_{i+x,j+y}}{\eta_{ij}} \right\} \quad (a)$$

According to a fifth aspect of the present invention, in the fourth aspect of the present invention, when a gradation voltage in accordance with a video signal before correction is Vg0, a threshold voltage of a drive element in an ideal pixel is Vth0, a current coefficient of the drive element in the ideal pixel is $\beta 0$, a light emission current efficiency of a display element in the ideal pixel is $\eta 0$, a threshold voltage of the drive element in the pixel $P_{ij}$ is $Vth_{ij}$, a current coefficient of the drive element in the pixel $P_{ij}$ is $\beta_{ij}$, a coefficient for obtaining a current when the drive element and the display element are connected in series based on a measurement result of a current which passes through the drive element without passing through the display element is $\alpha$, and an offset of a gradation voltage is Vofs, the first correction unit is configured to perform calculation shown by the following equation (b), and the correction calculation unit is configured to obtain the corrected video signal by adding the correction term obtained by the second correction unit to the video signal corrected by the first correction unit.

$$f1(P0, P_{ij}, \eta) = \sqrt{\frac{\beta 0 \cdot \eta 0}{\alpha \beta_{ij} \eta_{ij}}} (Vg0 - Vth0) + Vth_{ij} + Vofs \quad (b)$$

According to a sixth aspect of the present invention, in the first aspect of the present invention, the correction calculation unit further includes a light emission current efficiency storage unit configured to store for each pixel the light emission current efficiency obtained by the light emission current efficiency calculation unit, and the second correction unit is configured to obtain the correction term based on the light emission current efficiency stored in the light emission current efficiency storage unit.

According to a seventh aspect of the present invention, in the first aspect of the present invention, the correction calculation unit further includes: an initial current ratio calculation unit configured to obtain an initial current ratio for each pixel based on the current measurement result, the initial current ratio being a ratio to a current in an initial state; and a table configured to store a relation between the initial current ratio and the light emission current efficiency, and the light emission current efficiency calculation unit is configured to obtain the light emission current efficiency by referring to the table using the initial current ratio obtained by the initial current ratio calculation unit.

According to an eighth aspect of the present invention, in the seventh aspect of the present invention, the table is configured to store a relation among a temperature, the initial current ratio, and the light emission current efficiency, and the light emission current efficiency calculation unit is configured to obtain the light emission current efficiency by referring to the table using a measured operating temperature and the initial current ratio obtained by the initial current ratio calculation unit.

According to a ninth aspect of the present invention, in the first aspect of the present invention, the correction calculation unit further includes an adder configured to add the correction term obtained by the second correction unit to the video signal corrected by the first correction unit.

According to a tenth aspect of the present invention, there is provided a drive method for a current drive-type display device having a plurality of pixels arranged two-dimensionally, each including a display element and a drive element provided in series with the display element to control an amount of a current flowing through the display element, the drive method including: a step of measuring a current which passes through the drive element and is output to an outside of the pixel, without passing through the display element; a step of obtaining a light emission current efficiency of the display element for each pixel based on a current measurement result; a first correction step of correcting a video signal for each pixel in view of characteristics of each pixel, based on the current measurement result and the light emission current efficiency; and a second correction step of obtaining a correction term for each pixel in view of a difference in the light emission current efficiency compared to neighboring pixels, based on a two-dimensional distribution of the light emission current efficiency; a step of obtaining a corrected video signal based on the video signal corrected in the first correction step and the correction term obtained in the second correction step; and a step of writing a voltage in accordance with the corrected video signal to the pixel.

According to the first or tenth aspect of the present invention, the correction term in view of the difference in the light emission current efficiency compared to the neighboring pixels is obtained based on the two-dimensional distribution of the light emission current efficiency, and the video signal is corrected using the obtained correction term. Thus, even if a difference exists in the light emission current efficiency between pixel regions, the difference can be compensated, and a luminance difference at a boundary between the pixel regions can be reduced.

According to the second or third aspect of the present invention, the correction term is obtained based on the average value of the change rates of the light emission current efficiency between the pixel and the neighboring pixels. Thus, it is possible to obtain the correction term for compensating for the difference of the light emission current efficiency between the pixel regions.

According to the fourth aspect of the present invention, the correction term for compensating for the difference of the light emission current efficiency between the pixel regions can be obtained following the equation (a).

According to the fifth aspect, the corrected video signal can be obtained following the equations (a) and (b).

According to the sixth aspect of the present invention, it is possible to easily obtain the correction term based on the two-dimensional distribution of the light emission current efficiency, by using the light emission current efficiency storage unit which stores the light emission current efficiency for each pixel.

According to the seventh aspect of the present invention, it is possible to obtain the light emission current efficiency easily based on the initial current ratio, by using the table which stores the relation between the initial current ratio and the light emission current efficiency.

According to the eighth aspect of the present invention, even if the relation between the initial current ratio and the light emission current efficiency changes in accordance with the temperature, the light emission current efficiency in accordance with the operating temperature can be obtained using the table which stores the relation among the operating temperature, the initial current ratio, and the light emission current efficiency.

According to a ninth aspect of the present invention, by using the adder, it is possible to obtain the corrected video signal, which is obtained by adding the correction term obtained by the second correction unit to the video signal corrected by the first correction unit.

BRIEF DESCRIPTION OF THE DRAWINGS

FIG. 1 is an equivalent circuit diagram of a pixel including an organic EL element during light emission.

FIG. 2 is a diagram showing a pixel displaying black and a pixel displaying white.

FIG. 3 is a diagram showing voltage-current characteristics of the pixel shown in FIG. 1.

DETAILED DESCRIPTION OF THE INVENTION

Figure 4:
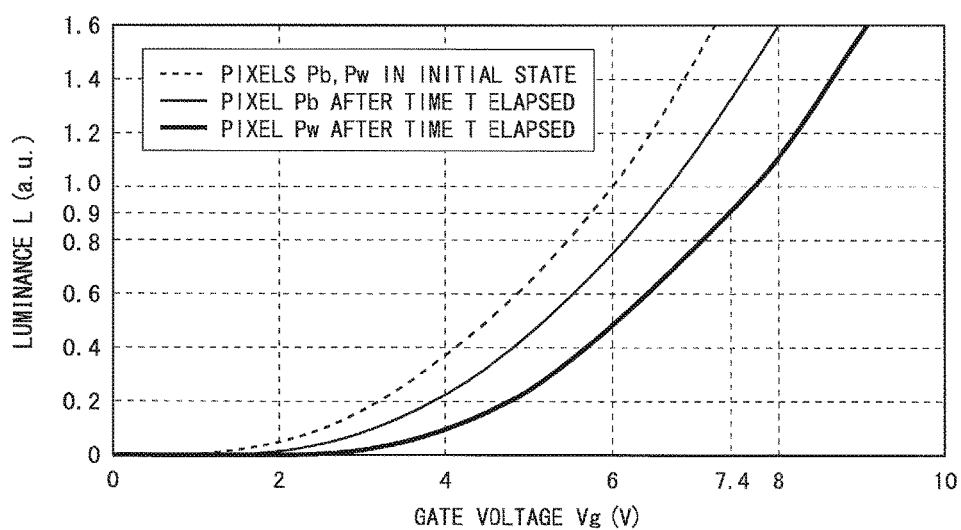
FIG. 4 is a diagram showing voltage-luminance characteristics of the pixel shown in FIG. 1.

Before describing a display device according to an embodiment of the present invention, basic consideration for guiding the present invention will be described referring to FIGS. 1 to 5. FIG. 1 is an equivalent circuit diagram of a pixel including an organic EL element during light emission. A circuit shown in FIG. 1 includes an organic EL element L1 and a drive TFT Q1. The organic EL element L1 is a light emission-type display element which emits light at luminance in accordance with an amount of a current passing therethrough. The drive TFT Q1 is a drive element which is connected in series with the organic EL element L1 and controls the amount of the current flowing through the organic EL element L1.

The drive TFT Q1 is an N-channel type transistor. A high-level power supply voltage Van is applied to a drain terminal of the drive TFT Q1. A source terminal of the drive TFT Q1 is connected to an anode terminal of the organic EL element L1. A low-level power supply voltage Vca is applied to a cathode terminal of the organic EL element L1. A gate voltage Vg is applied to a gate terminal of the drive TFT Q1.

It is assumed that an anode voltage of the organic EL element L1 (equal to a source voltage of the drive TFT Q1) is Voled, a threshold voltage of the drive TFT Q1 is Vth, and a light emission threshold voltage of the organic EL element L1 is Vtho. It is further assumed that when the organic EL element L1 emits light, a current flowing through the drive TFT Q1 is Ids, and a current flowing through the organic EL element L1 is Ioled. In the circuit shown in FIG. 1, since almost all of the current flowing through the drive TFT Q1 flows through the organic EL element L1, it is allowed to consider that Ids=Ioled. Hereinafter, such a current which flows during light emission is referred to as a pixel current. The pixel current Ids changes in accordance with a gate-source voltage Vgs (=Vg−Voled) of the drive TFT Q1.

It is assumed that there are two pixels Pb, Pw as shown in FIG. 2, the two pixels Pb, Pw are equivalent to the circuit shown in FIG. 1 during light emission, and the pixel Pb displays black and the pixel Pw displays white until a predetermined time (hereinafter, referred to as a time T) has elapsed since an initial state. FIG. 3 is a diagram showing voltage-current characteristics with respect to the pixels Pb, Pw in the initial state and after the time T has elapsed. In FIG. 3, a horizontal axis represents the gate voltage Vg, and a vertical axis represents the pixel current Ids. The pixel current Ids is normalized so that a level thereof when Vg=6.0 V in the initial state is transformed to 1.0.

In an example shown in FIG. 3, Vth=2.0 V and Vtho=3.0 V for the pixels Pb, Pw in the initial state. Vth=2.5 V and Vtho=3.2 V for the pixel Pb after the time T has elapsed. Vth=3.0 V and Vtho=3.4 V for the pixel Pw after the time T has elapsed. Note that these values cannot be read directly from FIG. 3. The threshold voltage Vth of the drive TFT Q1 and the light emission threshold voltage Vtho of the organic EL element L1 change more largely in the pixel Pw displaying white than in the pixel Pb displaying black.

The organic EL display device sets the gate voltage Vg so that the pixel current Ids after the time T has elapsed coincides with the pixel current in the initial state. In the example shown in FIG. 3, the gate voltage Vg that makes the pixel current Ids 1.0 is 6.7 V in the pixel Pb after the time T has elapsed, and 7.4 V in the pixel Pw after the time T has elapsed. Thus, the gate voltage Vg after the time T has elapsed is set to 6.7 V for the pixel Pb, and is set to 7.4 V for the pixel Pw.

FIG. 4 is a diagram showing voltage-luminance characteristics with respect to the pixels Pb, Pw in the initial state and after the time T has elapsed. In FIG. 4, a horizontal axis represents the gate voltage Vg, and a vertical axis represents a luminance L of the pixel. When the gate voltage Vg is set by the above-described method, the luminance of the pixel Pb after the time T has elapsed is 1.0 as in the initial state. On the other hand, the luminance of the pixel Pw after the time T has elapsed is 0.9, which is lower than the luminance of the pixel Pb by 10%. The reason why a difference in the luminance is caused between the pixels Pb, Pw after the time T has elapsed is that more current flows through the organic EL element L1 in the pixel Pw than in the pixel Pb, and that a light emission current efficiency of the organic EL element L1 deteriorates more largely.

Even if variation of about 10% or lower is caused randomly in the luminance of the pixel in the display screen of the organic EL display device, an observer can hardly recognize the luminance difference of the adjacent two pixels. Thus, such degradation in the image quality of the display image does not cause a problem. However, when a pixel region Ab displaying black and a pixel region Aw displaying white are adjacent, the light emission current efficiency of the organic EL element L1 in each pixel deteriorates more largely in the pixel region Aw than in the pixel region Ab. Thus, the observer may recognize the luminance difference at a boundary between the pixel regions Ab, Aw. When the pixel regions Ab, Aw have sizes equal to or more than some degree and there is a difference of 2% or more between an average luminance of the pixel region Ab and an average luminance of the pixel region Aw, the observer recognizes the luminance difference at the boundary between the pixel regions Ab, Aw. The luminance difference is likely to be caused when an image of a checker pattern, a web content or the like is displayed for a long time, for example.

In an organic EL display device including the pixels having the characteristics shown in FIGS. 3 and 4, when the gate voltage Vg is set to 6.7 V in the pixels in the pixel region Ab, and the gate voltage Vg is set to 7.4 V in the pixels in the pixel region Aw after the time T has elapsed, the luminance difference of 10% is caused at the boundary between the pixel regions Ab, Aw. In this case, the luminance difference at the boundary between the pixel regions Ab, Aw can be made to almost zero, if the gate voltage Vg is set to 7.7 V in the pixels in the pixel region Aw.

Figure 5:
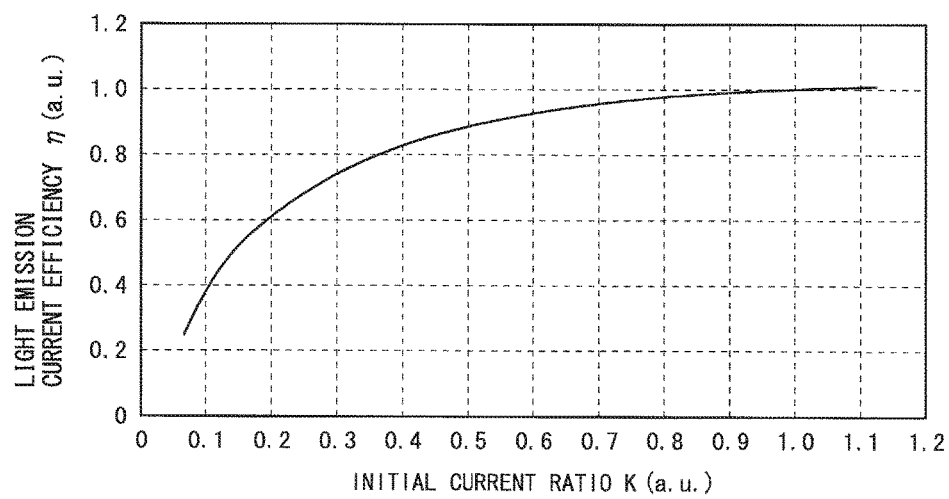
FIG. 5 is a diagram showing a relation between an initial current ratio and a light emission current efficiency with respect to the pixel shown in FIG. 1.

Generally, in the organic EL display device, the characteristics of the organic EL element and the characteristics of the drive TFT deteriorate largely in the pixel having a longer light emission time and a higher light emission luminance. Moreover, there is a certain relation between an initial current ratio K and a light emission current efficiency η in the pixel of the organic EL display device. FIG. 5 is a diagram showing a relation between the initial current ratio K and the light emission current efficiency η with respect to the pixel shown in FIG. 1. Here, the light emission current efficiency η is a value obtained by dividing the luminance of the organic EL element by a density of the current flowing through the organic EL element. The initial current ratio K is a value obtained by dividing the pixel current when a predetermined voltage is applied to the gate terminal of the drive TFT by the pixel current when the same voltage is applied to the gate terminal of the drive TFT in the initial state. For example, with respect to the pixel shown in FIG. 1, when the gate voltage necessary for making a pixel current I0 to flow in the initial state is Vg0, and the pixel current when the gate voltage is set to Vg0 after the time T has elapsed is I1, K is given by K=I1/I0.

In order to perform high image quality display in the organic EL display device, fluctuation in the light emission current efficiency η of the organic EL element needs to be compensated. As described above, there is a certain relation between the initial current ratio K and the light emission current efficiency η. Thus, in the present invention, a current which passes through the drive TFT Q1 and is output to an outside of a pixel 18, without passing through the organic EL element L1 (hereinafter, referred to as a drain current of the drive TFT Q1) when a measurement voltage is written to the pixel is measured to obtain the initial current ratio K, and the light emission current efficiency η is obtained based on the obtained initial current ratio K. Therefore, according to the present invention, as described later, it is possible to correct a video signal without measuring a current flowing through the organic EL element, by obtaining the light emission current efficiency η based on a change rate in the drain current referring to a lookup table. Moreover, in order to reduce the luminance difference at the boundary between the pixel regions, the video signal is corrected based on a two-dimensional distribution of the light emission current efficiency η in the present invention. Thus, according to the present invention, it is possible to reduce the luminance difference at the boundary between the pixel regions and perform high image quality display.

Figure 6:
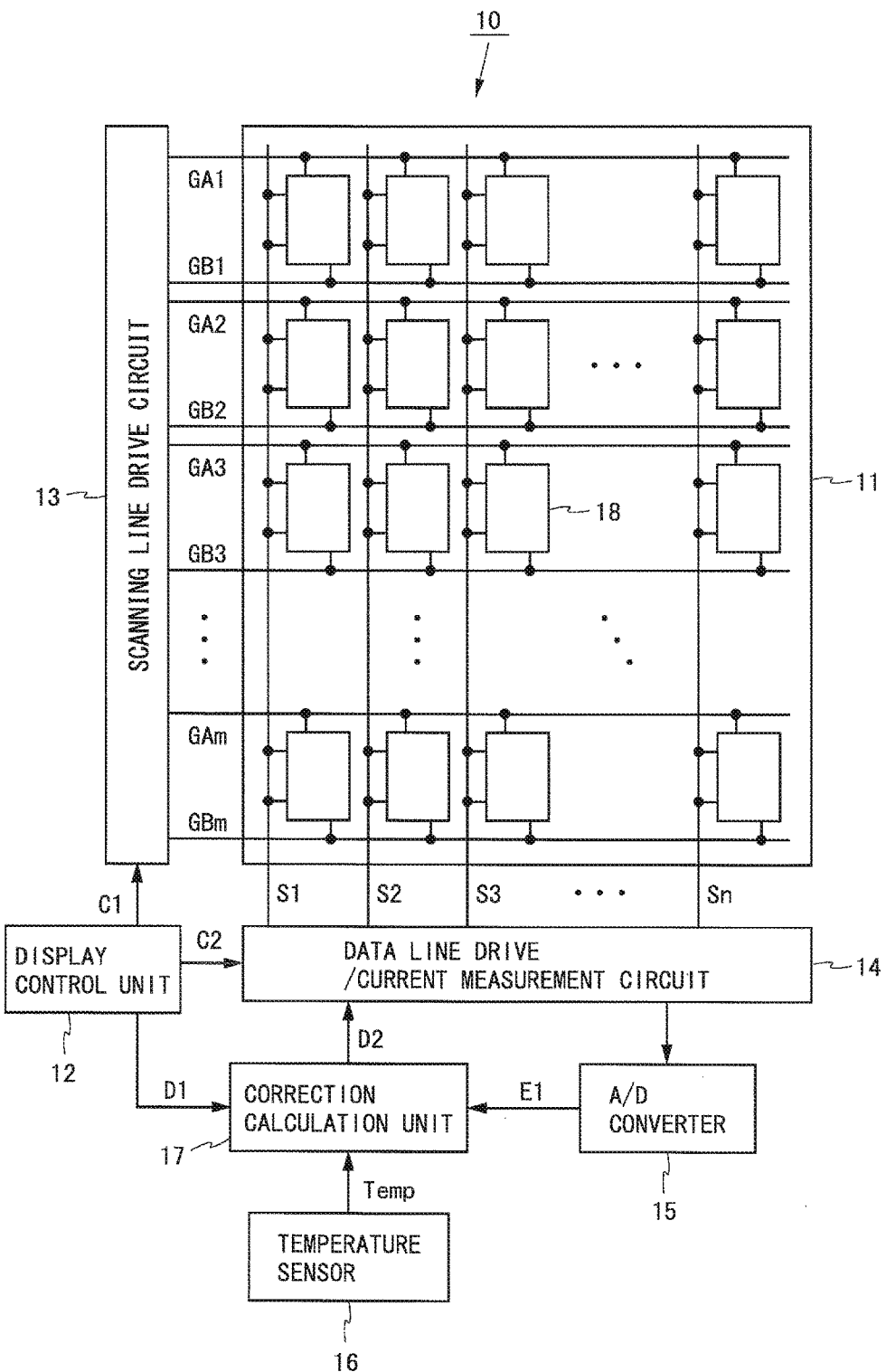
FIG. 6 is a block diagram showing a configuration of a display device according to an embodiment of the present invention.

Hereinafter, a display device according to an embodiment of the present invention will be described referring to FIGS. 6 to 9. FIG. 6 is a block diagram showing a configuration of the display device according to the embodiment of the present invention. A display device 10 shown in FIG. 6 is a current drive-type organic EL display device including a display unit 11, a display control circuit 12, a scanning line drive circuit 13, a data line drive/current measurement circuit 14, an A/D converter 15, a temperature sensor 16, and a correction calculation unit 17. Hereinafter, m and n are integers not smaller than 2, i is an integer not smaller than 1 and not larger than m, and j is an integer not smaller than 1 and not larger than n.

The display unit 11 includes 2 m scanning lines GA1 to GAm, GB1 to GBm, n data lines S1 to Sn, and (m×n) pixels 18. The scanning lines GA1 to GAm, GB1 to GBm are arranged in parallel to one another. The data lines S1 to Sn are arranged in parallel to one another so as to cross with the scanning lines GA1 to GAm, GB1 to GBm perpendicularly. The scanning lines GA1 to GAm and the data lines S1 to Sn intersect at (m×n) points. The (m×n) pixels 18 are arranged two-dimensionally corresponding to the intersections of the scanning lines GA1 to GAm and the data lines S1 to Sn. A high-level power supply voltage Van and a low-level power supply voltage Vca are supplied to the pixels 18 using electrodes not shown.

In the display device 10, one frame period is divided into a video signal period including m line periods, and a vertical flyback period. The display control circuit 12 is a control circuit of the display device 10. The display control circuit 12 outputs a control signal C1 to the scanning line drive circuit 13, outputs a control signal C2 to the data line drive/current measurement circuit 14, and outputs a video signal D1 to the correction calculation unit 17.

The scanning line drive circuit 13 drives the scanning lines GA1 to GAm, GB1 to GBm in accordance with the control signal C1. Specifically, in an i-th line period, the scanning line drive circuit 13 controls a voltage of the scanning line GAi to be at a high level (selection level), and voltages of the other scanning lines to be at a low level (non-selection level). In the vertical flyback period, the scanning line drive circuit 13 selects one pair of scanning lines GAi, GBi from among the scanning lines GA1 to GAm, GB1 to GBm, and controls voltages of the selected scanning lines GAi, GBi to be at the high level sequentially for a predetermined time, and controls voltages of the other scanning lines to be at the low level. The scanning lines GAi, GBi selected in the vertical flyback period are switched every two frame periods.

The control signal C2 and a corrected video signal D2 output from the correction calculation unit 17 are supplied to the data line drive/current measurement circuit 14. The data line drive/current measurement circuit 14 has a function of driving the data lines S1 to Sn and a function of measuring currents that are output to the data lines S1 to Sn from the pixels 18 in one row (n pixels 18). Specifically, the data line drive/current measurement circuit 14 applies n data voltages in accordance with the video signal D2 to the data lines S1 to Sn, according to the control signal C2 in the video signal period. In the vertical flyback period, the data line drive/current measurement circuit 14 applies n measurement voltages to the data lines S1 to Sn according to the control signal C2, converts to voltages n currents that are output from the pixels 18 in one row to the data lines S1 to Sn, and outputs the obtained voltages. The data line drive/current measurement circuit 14 functions as a drive circuit which writes to the pixel the voltage in accordance with the corrected video signal, and also functions as a current measurement circuit which measures the current passing through the drive element.

The A/D converter 15 converts output voltages of the data line drive/current measurement circuit 14 to digital current measurement data E1. The temperature sensor 16 measures an operating temperature Temp of the display device 10. In the vertical flyback period, the correction calculation unit 17 obtains data necessary for correcting the video signal D1 (hereinafter referred to as correction data), based on the current measurement data E1 output from the A/D converter 15 and the operating temperature Temp detected by the temperature sensor 16. In the video signal period, the correction calculation unit 17 corrects the video signal D1 output from the display control circuit 12, referring to the correction data obtained in the vertical flyback period, and outputs the corrected video signal D2.

Figure 7:
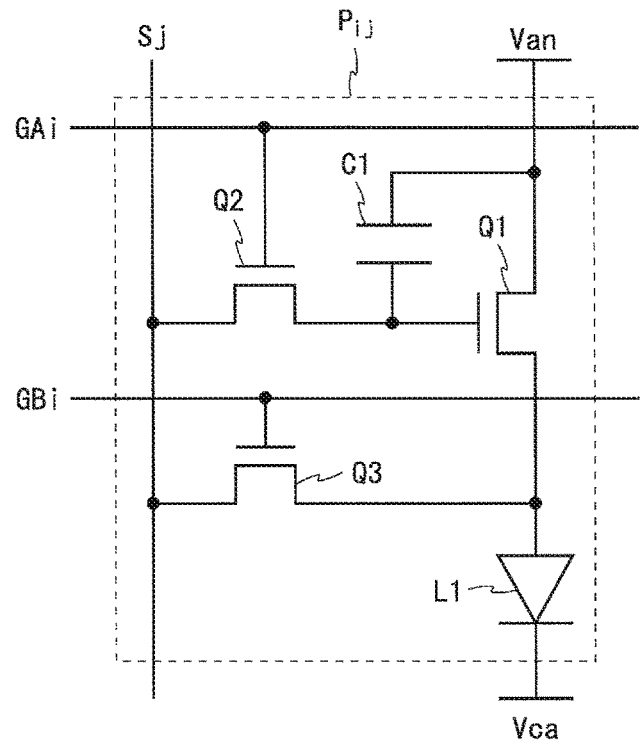
FIG. 7 is a circuit diagram of a pixel included in the display device shown in FIG. 6.

Hereinafter, the pixel 18 in an i-th row and a j-th column is referred to as $P_{ij}$. FIG. 7 is a circuit diagram of the pixel $P_{ij}$. As shown in FIG. 7, the pixel $P_{ij}$ includes the organic EL element L1, the drive TFT Q1, a write TFT Q2, a read TFT Q3 and a capacitor C1, and is connected to the scanning lines GAi, GBi, and a data line Sj.

The three TFTs Q1 to Q3 are N-channel type transistors. The high-level power supply voltage Van is applied to a drain terminal of the drive TFT Q1. A source terminal of the drive TFT Q1 is connected to an anode terminal of the organic EL element L1. The low-level power supply voltage Vca is applied to a cathode terminal of the organic EL element L1. One conduction terminal (left terminal in FIG. 7) of the write TFT Q2 and one conduction terminal of the read TFT Q3 are connected to the data line Sj. The other conduction terminal of the write TFT Q2 is connected to a gate terminal of the drive TFT Q1, and the other conduction terminal of the read TFT Q3 is connected to the source terminal of the drive TFT Q1 and the anode terminal of the organic EL element L1. A gate terminal of the write TFT Q2 is connected to the scanning line GAi, and a gate terminal of the read TFT Q3 is connected to the scanning line GBi. The capacitor C1 is provided between the gate terminal and the drain terminal of the drive TFT Q1.

Figure 8:
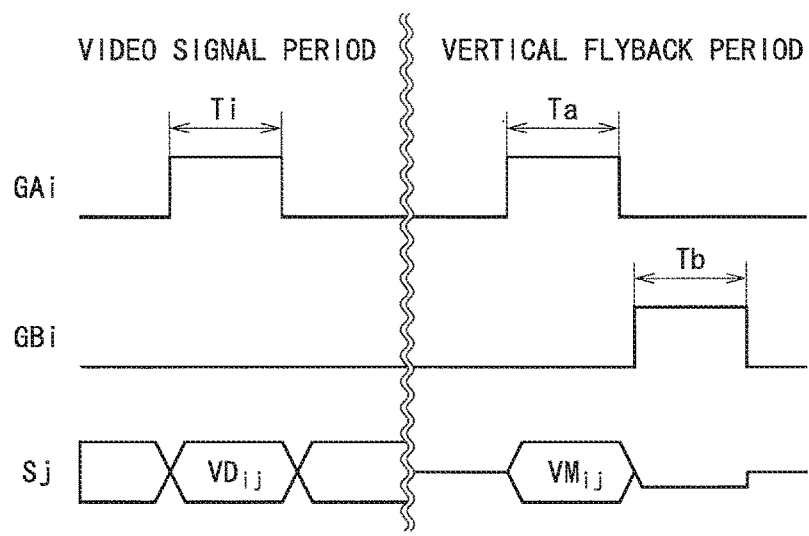
FIG. 8 is a timing chart of the pixel shown in FIG. 7.

FIG. 8 is a timing chart of the pixel $P_{ij}$. As shown in FIG. 8, in an i-th line period Ti in the video signal period, the voltage of the scanning line GAi becomes at the high level, a voltage of the scanning line GBi becomes at the low level, and a data voltage $VD_{ij}$ is applied to the data line Sj. In the line period Ti, the write TFT Q2 is turned on, the read TFT Q3 is turned off, and a gate voltage Vg of the drive TFT Q1 becomes equal to the data voltage $VD_{ij}$. At the end of the line period Ti, the voltage of the scanning line GAi is changed to the low level, and the write TFT Q2 is turned off accordingly. After this, the gate voltage Vg of the drive TFT Q1 is held by an action of the capacitor C1. Moreover, the pixel current Ids having an amount in accordance with the gate-source voltage Vgs of the drive TFT Q1 flows through the drive TFT Q1 and the organic EL element L1, and the organic EL element L1 emits light at luminance in accordance with the gate voltage Vg of the drive TFT Q1.

In the vertical flyback period in which the scanning lines GAi, GBi are selected, two periods Ta, Tb shown in FIG. 8 are set. In the period Ta, the voltage of the scanning line GAi becomes at the high level, the voltage of the scanning line GBi becomes at the low level, and a measurement voltage $VM_{ij}$ is applied to the data line Sj. In the period Ta, the write TFT Q2 is turned on, the read TFT Q3 is turned off, and the gate voltage Vg of the drive TFT Q1 becomes equal to the measurement voltage $VM_{ij}$. In the period Tb, the voltage of the scanning line GAi becomes at the low level, and the voltage of the scanning line GBi becomes at the high level. In the period Tb, the drive TFT Q1 and the read TFT Q3 are turned on, and the write TFT Q2 is turned off. At this time, a current passing through the drive TFT Q1 flows to the data line Sj via the read TFT Q3. The data line drive/current measurement circuit 14 converts the current output to the data line Sj to a voltage and outputs the obtained voltage in the period Tb.

Hereinafter, correction of the video signal D1 in the display device 10 will be described. In the display device 10, the data line drive/current measurement circuit 14 measures the drain current of the drive TFT Q1 when the measurement voltage VM is written with respect to the (m×n) pixels 18 included in the display unit 11. The A/D converter 15 converts the measured current to a digital value. The correction calculation unit 17 obtains the initial current ratio K based on the digital value obtained by the A/D converter 15 with respect to the (m×n) pixels 18, and obtains the light emission current efficiency η based on the initial current ratio K. Moreover, the correction calculation unit 17 corrects the video signal D1 based on a two-dimensional distribution of the light emission current efficiency η.

First, a method for obtaining the initial current ratio K will be described. When the display device 10 operates at first (or before factory shipment of the display device 10), an initial gradation value Z with which the drain current of the drive TFT Q1 is equal to a predetermined value I0 is obtained with respect to each pixel 18, by measuring the drain current of the drive TFT Q1 with switching the voltage written to the pixel 18 sequentially. (m×n) initial gradation values Z are stored in the correction calculation unit 17. In the vertical flyback period during operation of the display device 10, the data line drive/current measurement circuit 14 measures, with respect to each pixel 18, the drain current of the drive TFT Q1 when a first measurement voltage VM1 is written and the drain current of the drive TFT Q1 when a second measurement voltage VM2 is written. With respect to each pixel 18, the correction calculation unit 17 obtains an amount of the drain current of the drive TFT Q1 when a voltage in accordance with the initial gradation value Z is written, by an interpolation calculation or the like based on the two current measurement results, and obtains the initial current ratio K by dividing the obtained amount of the drain current by the value I0.

Alternatively, when the display device 10 operates at first (or before factory shipment of the display device 10), an initial current value Y is obtained with respect to each pixel 18, by measuring the drain current of the drive TFT Q1 when a predetermined initial voltage is written to the pixel 18. The (m×n) initial current values Y are stored in the correction calculation unit 17. The data line drive/current measurement circuit 14 obtains the two current measurement results with respect to each pixel 18 by a method similar to that described above. With respect to each pixel 18, the correction calculation unit 17 obtains the amount of the drain current of the drive TFT Q1 when the initial voltage is written, by an interpolation calculation or the like based on the two current measurement results, and obtains the initial current ratio K of the pixel 18 by dividing the obtained amount of the drain current by the initial current value Y.

Next, a method for obtaining the light emission current efficiency η will be described. As described above, there is a relation shown in FIG. 5 between the initial current ratio K and the light emission current efficiency η, for example. Moreover, the relation between the initial current ratio K and the light emission current efficiency η changes in accordance with a temperature. Thus, the correction calculation unit 17 includes a lookup table (hereinafter, referred to as an LUT) storing the light emission current efficiency η in association with the initial current ratio K, with respect to a plurality of operating temperatures Temp. With respect to each pixel 18, the correction calculation unit 17 obtains the light emission current efficiency η of the pixel 18, by referring to the LUT using the initial current ratio K and the operating temperature Temp measured by the temperature sensor 16. (m×n) pieces of light emission current efficiency η are stored in the correction calculation unit 17.

Next, correction of the video signal D1 will be described. With respect to each pixel 18, the data line drive/current measurement circuit 14 measures the drain current of the drive TFT Q1 when the first measurement voltage VM1 is written, and the drain current of the drive TFT Q1 when the second measurement voltage VM2 is written. The correction calculation unit 17 obtains the threshold voltage Vth and a current coefficient (gain) β of the drive TFT Q1 based on the two current measurement results, with respect to each pixel 18. The correction calculation unit 17 may obtain the threshold voltage Vth and the current coefficient β by solving simultaneous equations including the two current measurement results and taking the threshold voltage Vth and the current coefficient β as unknown quantities. Alternatively, the correction calculation unit 17 may obtain the threshold voltage Vth and the current coefficient β by repeating a processing of increasing or decreasing the threshold voltage Vth and the current coefficient β by a predetermined amount in accordance with the current measurement results.

The correction calculation unit 17 corrects data regarding the pixel 18 included in the video signal D1, using the threshold voltage Vth and the current coefficient β obtained with respect to each pixel 18. Moreover, with respect to the pixel 18 and a plurality of neighboring pixels, the correction calculation unit 17 obtains an average value of change rates in the light emission current efficiency η between the pixel 18 and the neighboring pixels, and obtains a correction term of the data with regarding the pixel 18 included in the video signal D1 based on the obtained average value. The correction calculation unit 17 obtains the data regarding the pixel 18 included in the corrected video signal D2, by adding the correction term to the data corrected using the threshold voltage Vth and the current coefficient β.

Hereinafter, the processing in the correction calculation unit 17 will be described in detail. In the following description, a virtual pixel having ideal characteristics is referred to as an ideal pixel P0, and it is assumed that a threshold voltage of the drive TFT Q1 in the pixel $P_{ij}$ is $Vth_{ij}$, and a current coefficient thereof is $β_{ij}$. The correction calculation unit 17 decides a gate voltage $Vg_{ij}$ of the drive TFT Q1 in the pixel $P_{ij}$ so that a pixel current flowing through the pixel $P_{ij}$ is equal to a pixel current I0 flowing through the ideal pixel P0. At this time, the following equation (1) is established.

$$I0 = (β_{ij}/2)(Vg_{ij} - Vth_{ij})^2 \tag{1}$$

When the equation (1) is solved for $Vg_{ij}$ and an offset Vofs is considered, the following equation (2) is derived.

$$Vg_{ij} = \sqrt{(2I0/β_{ij})} + Vth_{ij} - Vofs \tag{2}$$

The threshold voltage of the drive TFT Q1 is different between the ideal pixel P0 and the pixel $P_{ij}$. Moreover, a current/voltage stress received by the drive TFT Q1 differs depending on the level of the threshold voltage. Thus, if the same current stress is given to the ideal pixel P0 and the pixel $P_{ij}$, a fluctuation amount in the threshold voltage of the drive TFT Q1 is different between the ideal pixel P0 and the pixel $P_{ij}$.

It is assumed that when the time T has elapsed from the initial state, the threshold voltage of the drive TFT Q1 in the ideal pixel P0 changes from Vth0 to Vth0', the current coefficient changes from β0 to β0', and the pixel current when the gate voltage of the drive TFT Q1 is set to Vg0 changes from I0 to I0'. At this time, the following equations (3a), (3b) are established.

$$I0 = (β0/2) \times (Vg0 - Vth0 + Vofs)^2 \tag{3a}$$

$$I0' = (β0'/2) \times (Vg0 - Vth0' + Vofs)^2 \tag{3b}$$

The following equation (4) is derived from the equations (3a) and (3b), by setting ΔVth0=Vth0'−Vth0. The equation (4) represents a fluctuation amount of the threshold voltage of the drive TFT Q1 in the ideal pixel P0 when the current/voltage stress is received.

$$\Delta Vth0 = a0\{1 - \sqrt{(A0/B0)}\} \quad (4)$$

a0, A0, and B0 included in the equation (4) are given by the following equations.

$$a0 = Vg0 - Vth0 + Vofs$$

$$A0 = I0'/I0$$

$$B0 = \beta 0'/\beta 0$$

Moreover, it is assumed that when the time T has elapsed from the initial state, the threshold voltage of the drive TFT Q1 in the pixel $P_{ij}$ changes from $Vth_{ij}$ to $Vth_{ij}'$, the current coefficient thereof changes from $\beta_{ij}$ to $\beta_{ij}'$, and the pixel current when the gate voltage of the drive TFT Q1 is set to Vg0 changes $I_{ij}$ to $I_{ij}'$. A fluctuation amount $\Delta Vth_{ij}$ of the threshold voltage of the drive TFT Q1 in the pixel $P_{ij}$ is given by the following equation (5), as with that described above.

$$\Delta Vth_{ij} = a_{ij}\{1 - \sqrt{(A_{ij}/B_{ij})}\} \quad (5)$$

$a_{ij}$, $A_{ij}$, and $B_{ij}$ included in the equation (5) are given by the following equations.

$$a_{ij} = Vg_{ij} - Vth_{ij} + Vofs$$

$$A_{ij} = I_{ij}'/I_{ij}$$

$$B_{ij} = \beta_{ij}'/\beta_{ij}$$

The fluctuation amount $\Delta Vth0$ of the threshold voltage of the drive TFT Q1 in the ideal pixel P0 and the fluctuation amount $\Delta Vth_{ij}$ of the threshold voltage of the drive TFT Q1 in the pixel $P_{ij}$ correspond to the light emission current efficiency η of the organic EL element L1 through which the same current flows. Thus, the following equation (6a) is derived by solving for A0 with setting $\Delta Vth0 = \Delta Vth_{ij}$.

$$A0 = B0[1 - (a_{ij}/a0) \times \{1 - \sqrt{(A_{ij}/B_{ij})}\}]^2 \quad (6a)$$

Moreover, when the fluctuation of the current coefficient β can be ignored, the following equation (6b) is derived by setting $B0 = B_{ij} = 1$ in the equation (6a).

$$A0 = \{(1 - (a_{ij}/a0) \times (1 - \sqrt{A_{ij}})\}^2 \quad (6b)$$

The light emission current efficiency $\eta_{ij}$ of the pixel $P_{ij}$ can be obtained by referring to the LUT which stores the light emission current efficiency η in association with the value of the initial current ratio K, using the value A0 obtained in the equation (6a) or (6b).

The correction calculation unit 17 corrects the video signal D1 following the following equation (7).

$$Vg = f1(P0, P_{ij}, \eta) + f2(\eta, i, j) \quad (7)$$

A first term in the equation (7) is a correction term of a gradation voltage based on differences of the characteristics (threshold voltage and current coefficient) of the drive TFT Q1 and the light emission current efficiency η between the ideal pixel P0 and the pixel $P_{ij}$, and is given by the following equation (8). A second term in the equation (7) is a correction term of the gradation voltage based on the two-dimensional distribution of the light emission current efficiency η, and is given by the following equation (9). In this manner, the first term in the equation (7) is a correction term in view of the characteristics of each pixel, and the second term in the equation (7) is a correction term in view of the difference of the light emission current efficiency η between the pixel and the neighboring pixels.

$$f1(P0, P_{ij}, \eta) = \sqrt{\frac{\beta 0 \cdot \eta 0}{\alpha \beta_{ij} \eta_{ij}}} (Vg0 - Vth0) + Vth_{ij} + Vofs \quad (8)$$

$$f2(\eta, i, j) = \delta\left\{1 - \frac{1}{(2p+1)(2q+1)} \sum_{x=-p}^{p} \sum_{y=-q}^{q} \frac{\eta_{i+x, j+y}}{\eta_{ij}}\right\} \quad (9)$$

Note that, α included in the equation (8) is a coefficient for obtaining the drain current of the drive TFT Q1 when the drive TFT Q1 and the organic EL element L1 are connected in series, based on the drain current of the drive TFT Q1 when the drive TFT Q1 exists alone. In other words, α is a coefficient for obtaining a current when the drive element and the display element are connected in series, based on a measurement result of a current passing through the drive element without passing through the display element. p and q included in the equation (9) are integers not smaller than 1. δ included in the equation (9) is a coefficient for obtaining an increase/decrease amount of the gradation voltage, based on an increase/decrease amount of the change rate of the light emission current efficiency η. The coefficient δ may be changed in accordance with the operating temperature Temp.

In the equation (9), the correction term of the gradation voltage is obtained by calculating an average value of the change rates of the light emission current efficiency η between the pixel $P_{ij}$ and the neighboring pixels with the respect to $\{(2p+1) \times (2q+1)\}$ neighboring pixels within a range of ±p pixels in a horizontal direction and ±q pixels in a vertical direction when the pixel $P_{ij}$ is in a center, and multiplying a value obtained by subtracting the average value from 1 by the coefficient δ. By using the correction term shown in the equation (9), when the difference exists in the characteristics of the elements in the pixels between the adjacent pixel regions, it is possible to determine that there is a difference in the light emission current efficiency η among the organic EL elements L1, and correct the video signal D1 so that the difference of the luminance after the correction becomes small.

Figure 9:
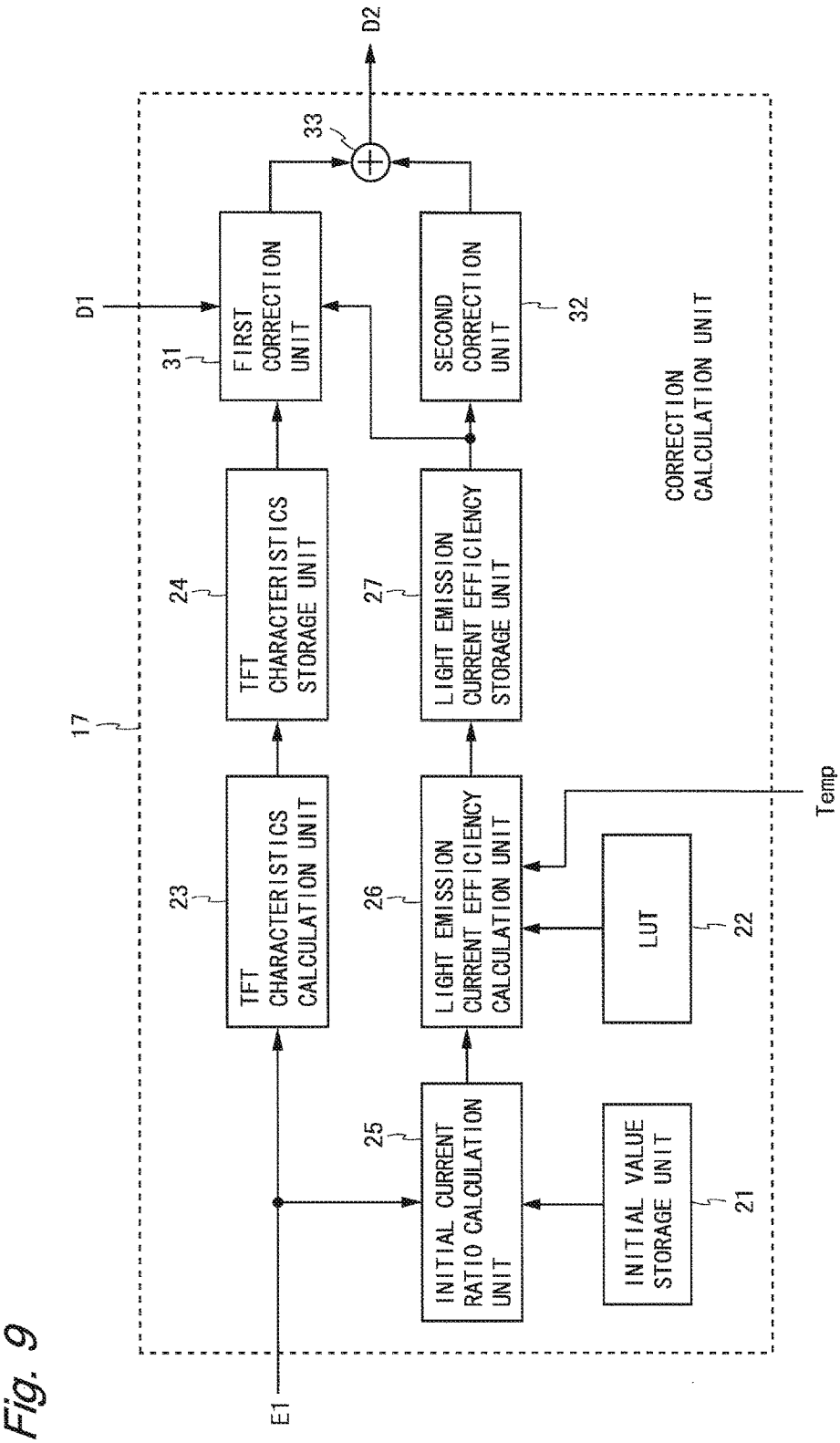
FIG. 9 is a block diagram showing details of a correction calculation unit of the display device shown in FIG. 6.

FIG. 9 is a block diagram showing details of the correction calculation unit 17. As shown in FIG. 9, the correction calculation unit 17 includes an initial value storage unit 21, a LUT 22, a TFT characteristics calculation unit 23, a TFT characteristics storage unit 24, an initial current ratio calculation unit 25, a light emission current efficiency calculation unit 26, a light emission current efficiency storage unit 27, a first correction unit 31, a second correction unit 32, and an adder 33. The video signal D1 output from the display control circuit 12, the current measurement data E1 output from the A/D converter 15, and the operating temperature Temp detected by the temperature sensor 16 are input to the correction calculation unit 17. The correction calculation unit 17 outputs the corrected video signal D2 based on these data.

The initial value storage unit 21 stores the (m×n) initial gradation values Z or the (m×n) initial current values Y. The initial values stored in the initial value storage unit 21 are set when the display device 10 operates at first (or before factory shipment of the display device 10). The LUT 22 stores the light emission current efficiency η in association with the initial current ratio K with respect to the plurality of operating temperatures Temp. The LUT 22 stores the light emission current efficiency η in association with the initial current ratio K, for example, with respect to the operating temperature Temp in units of 1° C. between the lowest operating temperature and the highest operating temperature. The content of the LUT 22 is set fixedly in advance before factory shipment of the display device 10.

The current measurement data E1 includes, as the data regarding the pixel $P_{ij}$, the drain current of the drive TFT Q1 when the first measurement voltage VM1 is written to the pixel $P_{ij}$, and the drain current of the drive TFT Q1 when the second measurement voltage VM2 is written to the pixel $P_{ij}$. The TFT characteristics calculation unit 23 obtains the threshold voltage $Vth_{ij}$ and the current coefficient $\beta_{ij}$ of the drive TFT Q1 in the pixel $P_{ij}$ based on the two current measurement results. The TFT characteristics calculation unit 23 performs the above-described processing for the (m×n) pixels 18 to obtain (m×n) threshold voltages Vth and (m×n) current coefficients β. The TFT characteristics storage unit 24 stores the (m×n) threshold voltages Vth and the (m×n) current coefficients β obtained by the TFT characteristics calculation unit 23.

The initial current ratio calculation unit 25 obtains an initial current ratio $K_{ij}$ of the pixel $P_{ij}$ based on the two current measurement results and the initial value (initial gradation value $Z_{ij}$ or initial current value $Y_{ij}$) stored in the initial value storage unit 21. If the initial gradation value $Z_{ij}$ is stored in the initial value storage unit 21, the initial current ratio calculation unit 25 obtains the initial current ratio $K_{ij}$ of the pixel $P_{ij}$, by obtaining the amount of the drain current of the drive TFT Q1 when the voltage in accordance with the initial gradation value $Z_{ij}$ is written, by an interpolation calculation based on the two current measurement results, and dividing the obtained amount of the drain current by the amount of the drain current when the initial gradation value is obtained. If the initial current value $Y_{ij}$ is stored in the initial value storage unit 21, the initial current ratio calculation unit 25 obtains the initial current ratio $K_{ij}$ of the pixel $P_{ij}$ by obtaining the amount of the drain current of the drive TFT Q1 when the initial voltage (voltage when the initial current value $Y_{ij}$ is obtained) is written by an interpolation calculation based on the two current measurement results, and dividing the obtained amount of the drain current by the initial current value $Y_{ij}$.

The light emission current efficiency calculation unit 26 refers to the LUT 22 using the initial current ratio $K_{ij}$ of the pixel $P_{ij}$ and the operating temperature Temp detected by the temperature sensor 16 to obtain the light emission current efficiency $\eta_{ij}$ of the pixel $P_{ij}$. The initial current ratio calculation unit 25 and the light emission current efficiency calculation unit 26 perform the above-described processing with respect to the (m×n) pixels 18 to obtain the (m×n) pieces of light emission current efficiency η. The light emission current efficiency storage unit 27 stores the (m×n) pieces of light emission current efficiency η obtained by the light emission current efficiency calculation unit 26.

The first correction unit 31 performs a calculation represented by the equation (8) with respect to the data regarding the pixel $P_{ij}$ included in the video signal D1, based on the threshold voltage $Vth_{ij}$ and the current coefficient $\beta_{ij}$ of the drive TFT Q1 in the pixel $P_{ij}$ stored in the TFT characteristics storage unit 24, and the light emission current efficiency $\eta_{ij}$ stored in the light emission current efficiency storage unit 27. The second correction unit 32 obtains the correction term of the data regarding the pixel $P_{ij}$ included in the video signal D1, following the equation (9) based on the light emission current efficiency η stored in the light emission current efficiency storage unit 27. The adder 33 adds the correction term obtained by the second correction unit 32 to the output of the first correction unit 31. Thus, the correction calculation represented by the equation (7) is performed with respect to the video signal D1.

An output of the adder 33 is output to the data line drive/current measurement circuit 14 as the corrected video signal D2. The data line drive/current measurement circuit 14 applies the data voltages in accordance with the corrected video signal D2 to the data lines S1 to Sn in the video signal period. The organic EL element L1 in the pixel 18 emits light at a luminance in accordance with the corrected video signal D2.

Figure 10A:
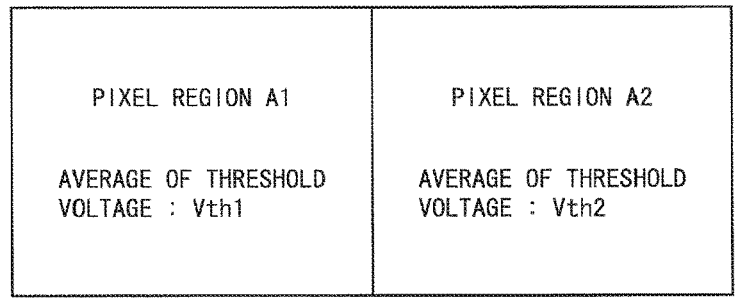
FIG. 10A is a diagram showing two adjacent pixel regions.
Figure 10B:
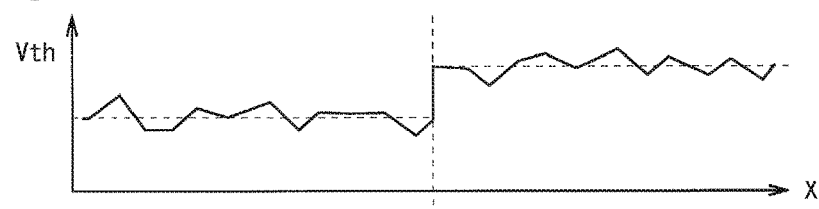
FIG. 10B is a diagram showing a threshold voltage of a drive TFT in each pixel in a specific row included in the pixel regions shown in FIG. 10A.
Figure 10C:
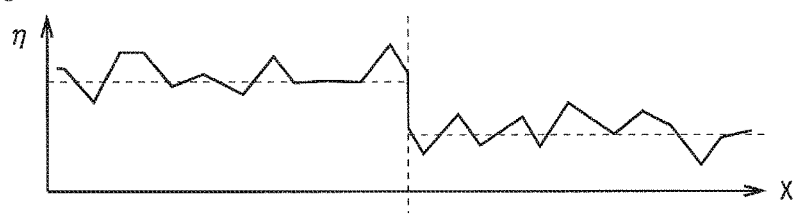
FIG. 10C is a diagram showing a light emission current efficiency of an organic EL element in each pixel in the specific row included in the pixel regions shown in FIG. 10A.

Hereinafter, effects of the display device 10 according to the present embodiment will be described referring to FIGS. 10A to 10E. Here, a display device which corrects the video signal D1 using only the first term in the equation (7) is taken as a display device of a comparative example. There will be considered a case in which two pixel regions A1, A2 are adjacent as shown in FIG. 10A. It is supposed that an average value of the threshold voltages of the drive TFTs Q1 in the pixels 18 included in the pixel region A1 is Vth1, and an average value of the threshold voltages of the drive TFTs Q1 in the pixels 18 in the pixel region A2 is Vth2 (Vth1<Vth2).

Attention will be paid to pixels arranged in a certain row (hereinafter, referred to as a row R) in the pixel regions A1, A2. The threshold voltage Vth of the drive TFTs Q1 in the pixels in the row R has a variation shown in FIG. 10B. Moreover, the light emission current efficiency η of the organic EL elements L1 in the pixels in the row R has a variation shown in FIG. 10C. In FIGS. 10B to 10E, a horizontal axis represents a position in the horizontal direction in the row R.

Figure 10D:
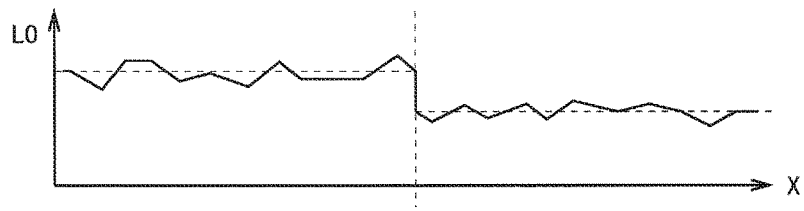
FIG. 10D is a diagram showing a luminance of each pixel in the specific row included in the pixel regions shown in FIG. 10A in a display device according to a comparative example.

FIG. 10D is a diagram showing a luminance L0 of the pixels in the row R in the display device of the comparative example. In the display device of the comparative example, the video signal D1 is corrected using only the first term in the equation (7). In this case, a difference between an estimated value of the light emission current efficiency based on the current measurement result and an actual light emission current efficiency is larger in the pixel region A2 than that in the pixel region A1. This causes a luminance difference at a boundary between the pixel regions A1, A2. Note that small ups and downs caused at positions apart from the boundary are based on correction errors due to resolution of the gradation voltage.

Figure 10E:
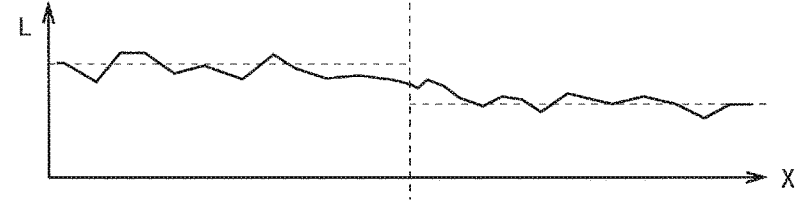
FIG. 10E is a diagram showing a luminance of each pixel in the specific row included in the pixel regions shown in FIG. 10A in the display device according to the embodiment of the present invention.

FIG. 10E is a diagram showing the luminance L of the pixels in the row R in the display device 10 according to the present embodiment. In the display device 10 according to the present embodiment, the video signal D1 is corrected following the equation (7) including the second term in the equation (7). In this case, the luminance L of the pixels changes smoothly around the boundary between the pixel regions A1, A2. Thus, according to the display device 10 of the present embodiment, the luminance difference at the boundary between the pixel regions A1, A2 can be reduced.

As described above, the display device 10 according to the present embodiment includes the plurality of pixels 18 arranged two-dimensionally, each including the display element (organic EL element L1) and the drive element (drive TFT Q1) provided in series with the display element to control the amount of the current flowing through the display element; the current measurement circuit (data line drive/current measurement circuit 14) which measures the current which passes through the drive element and is output to the outside of the pixels 18, without passing through the display element; the correction calculation unit 17 which corrects the video signal D1 based on the current measurement result by the current measurement circuit; and the drive circuit (data line drive/current measurement circuit 14) which writes the voltage in accordance with the corrected video signal D2 to the pixel 18. The correction calculation unit 17 includes the light emission current efficiency calculation unit 26 which obtains the light emission current efficiency η of the display element for each pixel based on the current measurement result (current measurement data E1); the first correction unit 31 which corrects (correction using the first term in the equation (7)) the video signal D1 for each pixel 18 in view of the characteristics of each pixel, based on the current measurement results; and the second correction unit 32 which obtains the correction term (second term in the equation (7)) for each pixel in view of the difference in the light emission current efficiency compared to the neighboring pixels, based on the two-dimensional distribution of the light emission current efficiency. The corrected video signal D2 is obtained based on the video signal corrected by the first correction unit 31 and the correction term obtained by the second correction unit 32.

According to the display device 10 of the present embodiment, the correction term (second term in the equation (7)) in view of the difference in the light emission current efficiency η compared to the neighboring pixels is obtained based on the two-dimensional distribution of the light emission current efficiency η, and the video signal D1 is corrected using the obtained correction term. Thus, even if the difference exists in the light emission current efficiency η between the pixel regions, the difference can be compensated, and the luminance difference at the boundary between the pixel regions can be reduced.

Moreover, the second correction unit 32 obtains for each pixel 18 the average value of the change rates of the light emission current efficiency between the pixel and the neighboring pixels, and obtains the correction term based on the average value for each pixel. Particularly, the second correction unit 32 obtains the correction term for each pixel 18 by multiplying the value obtained by subtracting the average value from 1 by the coefficient δ for each pixel. In this manner, the correction term is obtained based on the average value of the change rates of the light emission current efficiency η between the pixel 18 and the neighboring pixels. Thus, it is possible to obtain the correction term for compensating for the difference of the light emission current efficiency between the pixel regions.

Moreover, the correction calculation unit 17 further includes the light emission current efficiency storage unit 27 stores for each pixel 18 the light emission current efficiency η obtained by the light emission current efficiency calculation unit 26, and the second correction unit 32 obtains the correction term based on the light emission current efficiency η stored in the light emission current efficiency storage unit 27. Therefore, it is possible to easily obtain the correction term based on the two-dimensional distribution of the light emission current efficiency η, by using the light emission current efficiency storage unit 27.

Moreover, the correction calculation unit 17 includes the initial current ratio calculation unit 25 which obtains the initial current ratio K, which is a ratio to the current in the initial state, for each pixel 18 based on the current measurement result and the table (LUT 22) which stores the relation between the initial current ratio K and the light emission current efficiency η. The light emission current efficiency calculation unit 26 obtains the light emission current efficiency η by referring to the table using the initial current ratio K obtained by the initial current ratio calculation unit 25. Therefore, it is possible to obtain the light emission current efficiency η easily based on the initial current ratio K, by using the table.

Moreover, the table stores the relation among the temperature, the initial current ratio, and the light emission current efficiency, and the light emission current efficiency calculation unit 26 obtains the light emission current efficiency η by referring to the table using the measured operating temperature, and the initial current ratio K obtained by the initial current ratio calculation unit 25. Therefore, even if the relation between the initial current ratio K and the light emission current efficiency η changes in accordance with the temperature, the light emission current efficiency η in accordance with the operating temperature can be obtained by using the table.

Moreover, the correction calculation unit 17 includes the adder 33 which adds the correction term obtained by the second correction unit 32 to the video signal corrected by the first correction unit 31. Therefore, by using the adder, it is possible to obtain the corrected video signal D2, which is obtained by adding the correction term obtained by the second correction unit 32 to the video signal corrected by the first correction unit 31.

Note that the display device 10 described above is one example of the display device to which the present invention is applied. The present invention can be applied to the display device configured to be capable of reading the current passing through the drive element, from each pixel. The current passing through the drive element may be read via the data line, or may be read via a monitoring line for current measurement. The present invention can also be applied to a display device including an arbitrary pixel which is equivalent to the circuit shown in FIG. 1 during light emission and is capable of reading current passing through the drive TFT, in place the pixel $P_{ij}$ shown in FIG. 7. The present invention can also be applied to a display device operating at timing other than the timing shown in FIG. 8.

Since the display device of the present invention has a feature that a luminance difference at a boundary between pixel regions can be reduced, it can be utilized as various types of display devices including pixels each including a display element and a drive element, such as an organic EL display device.

DESCRIPTION OF REFERENCE CHARACTERS

10: DISPLAY DEVICE
11: DISPLAY UNIT
12: DISPLAY CONTROL CIRCUIT
13: SCANNING LINE DRIVE CIRCUIT
14: DATA LINE DRIVE/CURRENT MEASUREMENT CIRCUIT
15: A/D CONVERTER
16: TEMPERATURE SENSOR
17: CORRECTION CALCULATION UNIT
18: PIXEL
21: INITIAL VALUE STORAGE UNIT
22: LUT
23: TFT CHARACTERISTICS CALCULATION UNIT
24: TFT CHARACTERISTICS STORAGE UNIT
25: INITIAL CURRENT RATIO CALCULATION UNIT
26: LIGHT EMISSION CURRENT EFFICIENCY CALCULATION UNIT
27: LIGHT EMISSION CURRENT EFFICIENCY STORAGE UNIT
31: FIRST CORRECTION UNIT

32: SECOND CORRECTION UNIT
33: ADDER
L1: ORGANIC EL ELEMENT (DISPLAY ELEMENT)
Q1: DRIVE TFT (DRIVE ELEMENT)

The invention claimed is:
1. A current drive-type display device, comprising:
a plurality of pixels arranged two-dimensionally, each including a display element and a drive element provided in series with the display element to control an amount of a current flowing through the display element;
a current measurement circuit configured to measure a current which passes through the drive element and is output to an outside of the pixel, without passing through the display element;
a correction calculation unit configured to correct a video signal based on a current measurement result by the current measurement circuit; and
a drive circuit configured to write a voltage in accordance with a corrected video signal to the pixel, wherein the correction calculation unit includes:
a light emission current efficiency calculation unit configured to obtain a light emission current efficiency of the display element for each pixel based on the current measurement result;
a first correction unit configured to correct the video signal for each pixel in view of characteristics of each pixel, based on the current measurement result and the light emission current efficiency; and
a second correction unit configured to obtain a correction term for each pixel in view of a difference in the light emission current efficiency compared to neighboring pixels, based on a two-dimensional distribution of the light emission current efficiency, and
the correction calculation unit is configured to obtain the corrected video signal based on the video signal corrected by the first correction unit and the correction term obtained by the second correction unit; wherein
the correction calculation unit comprising:
a light emission current efficiency storage unit configured to store for each pixel a light emission current efficiency obtained by the light emission current efficiency calculation unit.

2. The display device according to claim 1, wherein the second correction unit is configured to obtain for each pixel an average value of change rates of the light emission current efficiency between the pixel and the neighboring pixels, and obtain the correction term based on the average value for each pixel.

3. The display device according to claim 2, wherein the second correction unit is configured to obtain the correction term for each pixel by multiplying a value obtained by subtracting the average value from 1 by a coefficient for each pixel.

4. The display device according to claim 3, wherein when the light emission current efficiency of a pixel $P_{ij}$ in an i-th row and a j-th column is $\eta_{ij}$ and a coefficient for obtaining an amount of increase or decrease of a gradation voltage based on an amount of increase or decrease of the change rate of the light emission current efficient is $\delta$, the second correction unit is configured to take pixels within a range of ±p pixels in a horizontal direction and ±q pixels in a vertical direction as the neighboring pixels when the pixel $P_{ij}$ is in a center, and obtain the correction term shown by the following equation (a).

$$f2(\eta, i, j) = \delta\left\{1 - \frac{1}{(2p+1)(2q+1)} \sum_{x=-p}^{p} \sum_{y=-q}^{q} \frac{\eta_{i+x,j+y}}{\eta_{ij}}\right\}. \quad (a)$$

5. The display device according to claim 4, wherein when a gradation voltage in accordance with a video signal before correction is Vg0, a threshold voltage of a drive element in an ideal pixel is Vth0, a current coefficient of the drive element in the ideal pixel is $\beta 0$, a light emission current efficiency of a display element in the ideal pixel is $\eta 0$, a threshold voltage of the drive element in the pixel $P_{ij}$ is $Vth_{ij}$, a current coefficient of the drive element in the pixel $P_{ij}$ is $\beta_{ij}$, a coefficient for obtaining a current when the drive element and the display element are connected in series based on a measurement result of a current which passes through the drive element without passing through the display element is $\alpha$, and an offset of aggradation voltage is Vofs, the first correction unit is configured to perform calculation shown by the following equation (b), and
the correction calculation unit is configured to obtain the corrected video signal by adding the correction term obtained by the second correction unit to the video signal corrected by the first correction unit.

$$f1(P0, P_{ij}, \eta) = \sqrt{\frac{\beta 0 \cdot \eta 0}{\alpha \beta_{ij} \eta_{ij}}} (Vg0 - Vth0) + Vth_{ij} + Vofs. \quad (b)$$

6. The display device according to claim 1, wherein the correction calculation unit further includes a light emission current efficiency storage unit configured to store for each pixel the light emission current efficiency obtained by the light emission current efficiency calculation unit, and
the second correction unit is configured to obtain the correction term based on the light emission current efficiency stored in the light emission current efficiency storage unit.

7. The display device according to claim 1, wherein the correction calculation unit further includes:
an initial current ratio calculation unit configured to obtain an initial current ratio for each pixel based on the current measurement result, the initial current ratio being a ratio to a current in an initial state; and
a table configured to store a relation between the initial current ratio and the light emission current efficiency, and
the light emission current efficiency calculation unit is configured to obtain the light emission current efficiency by referring to the table using the initial current ratio obtained by the initial current ratio calculation unit.

8. The display device according to claim 7, wherein the table is configured to store a relation among a temperature, the initial current ratio, and the light emission current efficiency, and
the light emission current efficiency calculation unit is configured to obtain the light emission current efficiency by referring to the table using a measured operating temperature and the initial current ratio obtained by the initial current ratio calculation unit.

9. The display device according to claim 1, wherein the correction calculation unit further includes an adder configured to add the correction term obtained by the second correction unit to the video signal corrected by the first correction unit.

10. A drive method for a current drive-type display device having a plurality of pixels arranged two-dimensionally, each including a display element and a drive element provided in series with the display element to control an amount of a current flowing through the display element, the drive method comprising:

- a step of measuring a current which passes through the drive element and is output to an outside of the pixel, without passing through the display element;
- a step of obtaining a light emission current efficiency of the display element for each pixel based on a current measurement result;
- a first correction step of correcting a video signal for each pixel in view of characteristics of each pixel, based on the current measurement result and the light emission current efficiency; and
- a second correction step of obtaining a correction term for each pixel in view of a difference in the light emission current efficiency compared to neighboring pixels, based on a two-dimensional distribution of the light emission current efficiency;
- a step of obtaining a corrected video signal based on the video signal corrected in the first correction step and the correction term obtained in the second correction step; and
- a step of writing a voltage in accordance with the corrected video signal to the pixel, wherein a current measurement circuit writes the voltage.

* * * * *